(12) United States Patent
Yamada

(10) Patent No.: US 7,835,023 B2
(45) Date of Patent: Nov. 16, 2010

(54) PRINT CONTROL APPARATUS, CONTROL PROGRAM OF PRINT CONTROL APPARATUS AND PRINTING SYSTEM

(75) Inventor: Takafumi Yamada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1160 days.

(21) Appl. No.: 11/477,424

(22) Filed: Jun. 30, 2006

(65) Prior Publication Data

US 2007/0002373 A1    Jan. 4, 2007

(30) Foreign Application Priority Data

Jun. 30, 2005 (JP) ............................ P2005-193175

(51) Int. Cl.
*G06F 3/12* (2006.01)
*G06K 1/00* (2006.01)

(52) U.S. Cl. .................... 358/1.15; 358/1.1; 358/1.9

(58) Field of Classification Search ................ 358/1.1, 358/1.9, 1.11–1.18
See application file for complete search history.

(56) References Cited

U.S. PATENT DOCUMENTS 6,388,757 B1 *   5/2002   Koga ..................... 358/1.11
2002/0054109 A1   5/2002   Ogino et al.

FOREIGN PATENT DOCUMENTS

| JP | 05-210629 A | 8/1993 |
|----|-------------|--------|
| JP | 06-115182 A | 4/1994 |
| JP | 2001-320539 A | 11/2001 |
| JP | 2002-014788 A | 1/2002 |
| JP | 2003-263263 A | 9/2003 |

OTHER PUBLICATIONS

Japan Patent Office, Notification of Reason for Refusal in counterpart Patent Application No. JP 2005-193175, mailed Jul. 13, 2010.

* cited by examiner

*Primary Examiner*—Thierry L Pham
(74) *Attorney, Agent, or Firm*—Baker Botts L.L.P.

(57) ABSTRACT

A print control apparatus that transmits print data and attribute information regarding the print data to a printing apparatus, which comprises a printing section and a display that displays the attribute information and stores a predetermined character code associated with a character or a symbol displayed on the display, comprises: a code system information request unit that requests the printing apparatus to transmit information of a code system of the stored character code; a code system receiving unit that receives information of the transmitted code system in response to request; an operation input unit to input information; a character code storing unit that stores a predetermined character code associated with a character or a symbol in each code system; and an attribute information input unit that inputs attribute information according to a received code system among code systems associated with the stored character code in response to inputting the attribute information.

16 Claims, 10 Drawing Sheets

FIG. 2

CHARACTER CODE INFORMATION STORING TABLE ↙ 14c

| PRINTER NAME | PORT NAME | CODE SYSTEM INFORMATION | ... |
|---|---|---|---|
| Printer1 | LPT 1 | JISX0201 | ... |
| Printer2 | USB | HPROMAN8 | ... |

FIG. 3A

CHARACTER CODE TABLE ASSOCIATED WITH CODE SYSTEM INFORMATION (JISX0201)

|   | ! | " | # | $ | % | & | ' | ( | ) | * | + | , | - | . | / |
|---|---|---|---|---|---|---|---|---|---|---|---|---|---|---|---|
| 0 | 1 | 2 | 3 | 4 | 5 | 6 | 7 | 8 | 9 | : | ; | < | = | > | ? |
| @ | A | B | C | D | E | F | G | H | I | J | K | L | M | N | O |
| P | Q | R | S | T | U | V | W | X | Y | Z | [ | ? | ] | ˜ | _ |
| ` | a | b | c | d | e | f | g | h | i | j | k | l | m | n | o |
| p | q | r | s | t | u | v | w | x | y | z | { | \| | } | ~ |   |
|   |   |   |   |   |   |   |   |   |   |   |   |   |   |   |   |
|   |   |   |   |   |   |   |   |   |   |   |   |   |   |   |   |
|   | ｡ | ｢ | ｣ | ､ | ･ | ｦ | ｱ | ｲ | ｳ | ｴ | ｵ | ｬ | ｭ | ｮ | ｯ |
| ｰ | ｱ | ｲ | ｳ | ｴ | ｵ | ｶ | ｷ | ｸ | ｹ | ｺ | ｻ | ｼ | ｽ | ｾ | ｿ |
| ﾀ | ﾁ | ﾂ | ﾃ | ﾄ | ﾅ | ﾆ | ﾇ | ﾈ | ﾉ | ﾊ | ﾋ | ﾌ | ﾍ | ﾎ | ﾏ |
| ﾐ | ﾑ | ﾒ | ﾓ | ﾔ | ﾕ | ﾖ | ﾗ | ﾘ | ﾙ | ﾚ | ﾛ | ﾜ | ﾝ | ﾞ | ﾟ |
|   |   |   |   |   |   |   |   |   |   |   |   |   |   |   |   |

CHARACTER CODE TABLE ASSOCIATED WITH CODE SYSTEM INFORMATION (HPROMAN8)

|   | ! | " | # | $ | % | & | ' | ( | ) | * | + | , | - | . | / |
|---|---|---|---|---|---|---|---|---|---|---|---|---|---|---|---|
| 0 | 1 | 2 | 3 | 4 | 5 | 6 | 7 | 8 | 9 | : | ; | < | = | > | ? |
| @ | A | B | C | D | E | F | G | H | I | J | K | L | M | N | O |
| P | Q | R | S | T | U | V | W | X | Y | Z | [ | ? | ] | ˜ | _ |
| ` | a | b | c | d | e | f | g | h | i | j | k | l | m | n | o |
| p | q | r | s | t | u | v | w | x | y | z | { | \| | } | ~ |   |
| □ |   | ‚ | ƒ | „ | … | † | ‡ | ˆ | ‰ | Š | ‹ | Œ |   | Ž |   |
|   | ' | ' | " | " | • | – | — | ˜ | ™ | š | › | œ |   | ž | Ÿ |
|   | ¡ | ¢ | £ | ¤ | ¥ | ¦ | § | ¨ | © | ª | « | ¬ | - | ® | ¯ |
| ° | ± | ² | ³ | ´ | µ | ¶ | · | ¸ | ¹ | º | » | ¼ | ½ | ¾ | ¿ |
| À | Á | Â | Ã | Ä | Å | Æ | Ç | È | É | Ê | Ë | Ì | Í | Î | Ï |
| Ð | Ñ | Ò | Ó | Ô | Õ | Ö | × | Ø | Ù | Ú | Û | Ü | Ý | Þ | ß |
| à | á | â | ã | ä | å | æ | ç | è | é | ê | ë | ì | í | î | ï |
| ð | ñ | ò | ó | ô | õ | ö | ÷ | ø | ù | ú | û | ü | ý | þ | ÿ |

14d

PRINT CONTROL APPARATUS, CONTROL PROGRAM OF PRINT CONTROL APPARATUS AND PRINTING SYSTEM

CROSS REFERENCE TO RELATED APPLICATION

This application claims priority from Japanese Patent Application No. 2005-193175, filed Jun. 30, 2005, the contents of which are hereby incorporated by reference into the present application.

TECHNICAL FIELD

Aspects of the present invention relate to a print control apparatus capable of displaying characters and symbols input on a side of the print control apparatus and displayed on a printing apparatus in a display mode input on the side of the print control apparatus, a control program of the print control apparatus and a printing system.

BACKGROUND

In performing a print job management function of a printer, a print job name or a username is displayed on a liquid crystal display (hereinafter simply referred to as LCD) mounted on the printer. The print job name and the username displayed by the print job management function are sent out together with print data from a transmission source apparatus, for example, a personal computer (hereinafter simply referred to as PC) and the like.

A PC comprises a printer driver, which is a program interface between its application program and a printer, assisting in exchanging data therebetween. The printer driver comprises a function of registering a print job name and a username. An operator can input the print job name and the username from a registration screen (dialogue box) displayed on a display section such as an LCD mounted on the PC to register them. In the registration, the operator can input any given information (characters and symbols) to set the print job name and the username.

When a code system of characters established on the data-transmitting side (the PC side) is different from that of characters set on the data-receiving side (the printer side), the print job name or the username transmitted from the PC is not displayed correctly on the printer. In other words, so called "garbled characters" occurs. For example, where an input operation is executed by a code system of katakana (Japanese syllabary) in the PC, the character code of katakana associated with the input character is transmitted to a printer. However, where the code system set in the printer is a code system of special characters in western countries, received data are read by the code system of special characters in western countries, resulting in an event that characters (those constituting a print job name and a username) output in a printer are garbled.

JP-A-05-210629 has disclosed a technology on a display control system. In a case where a message possessed by a host computer is displayed on a display section of a terminal unit of a user, the message is displayed by converting the message to a language in compliance with the terminal unit. The display control system selects a language in compliance with a terminal unit in outputting the message to the terminal unit and displays the message by the selected language. The host computer comprises a character code system storing unit for storing character code systems (code systems) that can be displayed on a display section. Where a character code system that displays a selected language is stored in the character code system storing unit, a message displayed on the display section is converted to a character code system stored in the character code system storing unit and output on the terminal unit. In contrast, where the character code system that displays a selected language is not stored in the character code storing unit, the message is output on the terminal unit as an original message that is stored in the host computer (original character code system). Accordingly, it is possible to avoid an event that the message output from the host computer and displayed on the display section becomes garbled characters.

However, JP-A-05-210629 has a drawback that garbled characters occur in a case where an original message stored in a host computer (message before conversion to a language in compliance with a terminal unit) is output on the terminal unit. This is because a character code system of the original message output from the host computer is not necessarily displayed on a display section of the terminal unit.

In general, a terminal unit is an independent unit and capable of setting a character code system displayed on a display section, irrespective of the relationship with a host computer. Therefore, for example, in storing plural character code systems, the character code system of the terminal unit may be changed, depending on an operator usability. Upon such change, a message converted by the host computer according to the character code system stored in a character code system storing unit will result in garbled characters when displayed on the display section of the terminal unit.

An aspect of the present invention provides a print control apparatus capable of displaying characters and symbols displayed on a printing apparatus in a display mode, which is input on a print control apparatus (a transmission source of the characters and symbols), a control program of the print control apparatus and a printing system.

SUMMARY

According to an aspect of the present invention, a print control apparatus that transmits print data and attribute information to a printing apparatus and controls the printing apparatus, which is connected to the print control apparatus, the printing apparatus comprising a printing section that prints the print data and a display that displays the attribute information regarding the print data and storing a predetermined character code associated with a character or a symbol displayed on the display, the print control apparatus comprises: a code system information request unit that requests the printing apparatus to transmit information of a code system of the character code stored in the printing apparatus; a code system receiving unit that receives information of the code system transmitted from the printing apparatus in response to request of the code system information request unit; an operation input unit that is operated by a user to input specified information; a character code storing unit that stores a predetermined character code associated with a character or a symbol in each code system; and an attribute information input unit that inputs attribute information according to a code system received by the code system receiving unit among code systems associated with the character code stored in the character code storing unit in response to inputting the attribute information by the operation input unit.

According to another aspect of the present invention, a print control apparatus that transmits print data and attribute information to a printing apparatus and controls the printing apparatus, which is connected to the print control apparatus, the printing apparatus comprising a printing section that prints the print data and a display that displays the attribute information regarding the print data, and storing a predetermined character code associated with a character or a symbol displayed on the display, the print control apparatus comprises: a code system information request unit that requests the printing apparatus to transmit information of a code system of the character code stored in the printing apparatus; a code system receiving unit that receives information of the code system transmitted from the printing apparatus in response to request of the code system information request unit; an operation input unit that is operated by a user to input specified information; a display section that displays information input by the operation input unit; a character code storing unit that stores a predetermined character code associated with a character or a symbol in each code system; a code system using display unit that indicates on the display section, as a usable code system, a code system received by the code system receiving unit, which is included in a code system associated with the character code stored in the character code storing unit; a code system specifying unit that specifies a desired code system, via the operation input unit, from the code system displayed by the code system using display unit; and an attribute information input unit that inputs by using the code system specified by the code system specifying unit, in response to inputting the attribute information by the operation input unit.

According to yet another aspect of the present invention, a computer program product for enabling a computer to control a print control apparatus that is connected to a printing apparatus comprising a printing section that prints print data and a display that displays attribute information regarding the print data and storing a predetermined character code associated with a character or a symbol displayed on the display, and comprises an operation input unit that inputs information through operation by a user, comprises: software instructions for enabling the computer to perform predetermined operations, and a computer readable medium bearing the software instructions. The predetermined operations comprises the steps of: transmitting the print data and the attribute information to the printing apparatus; requesting the printing apparatus to transmit the information on a code system of a character code stored in the printing apparatus; receiving the information of the code system transmitted from the printing apparatus in response to the request; and inputting the attribute information by using the received code system, in response to inputting the transmitted attribute information by the operation input unit.

According to yet another aspect of the present invention, a printing system, comprises: a printing apparatus that comprises a printing section that prints print data and a display that displays attribute information regarding the print data, and stores a predetermined character code associated with a character or a symbol displayed on the display; and a print control apparatus that is connected to the print control apparatus, transmits the print data and the attribute information to the printing apparatus and controls the printing apparatus. The print control apparatus comprises: a code system information request unit that requests the printing apparatus to transmit information of a code system of the character code stored in the printing apparatus; a code system receiving unit that receives information of the code system transmitted from the printing apparatus in response to request of the code system information request unit; an operation input unit that is operated by a user to input specified information; a character code storing unit that stores a predetermined character code associated with a character or a symbol in each code system; and an attribute information input unit that inputs attribute information according to a code system received by the code system receiving unit among code systems associated with the character code stored in the character code storing unit in response to inputting the attribute information by the operation input unit.

BRIEF DESCRIPTION OF THE DRAWINGS

FIG. 2 is a view schematically illustrating a character code information storing table;

FIGS. 3A and 3B are views schematically illustrating character code tables;

DETAILED DESCRIPTION OF THE INVENTION

Figure 1:
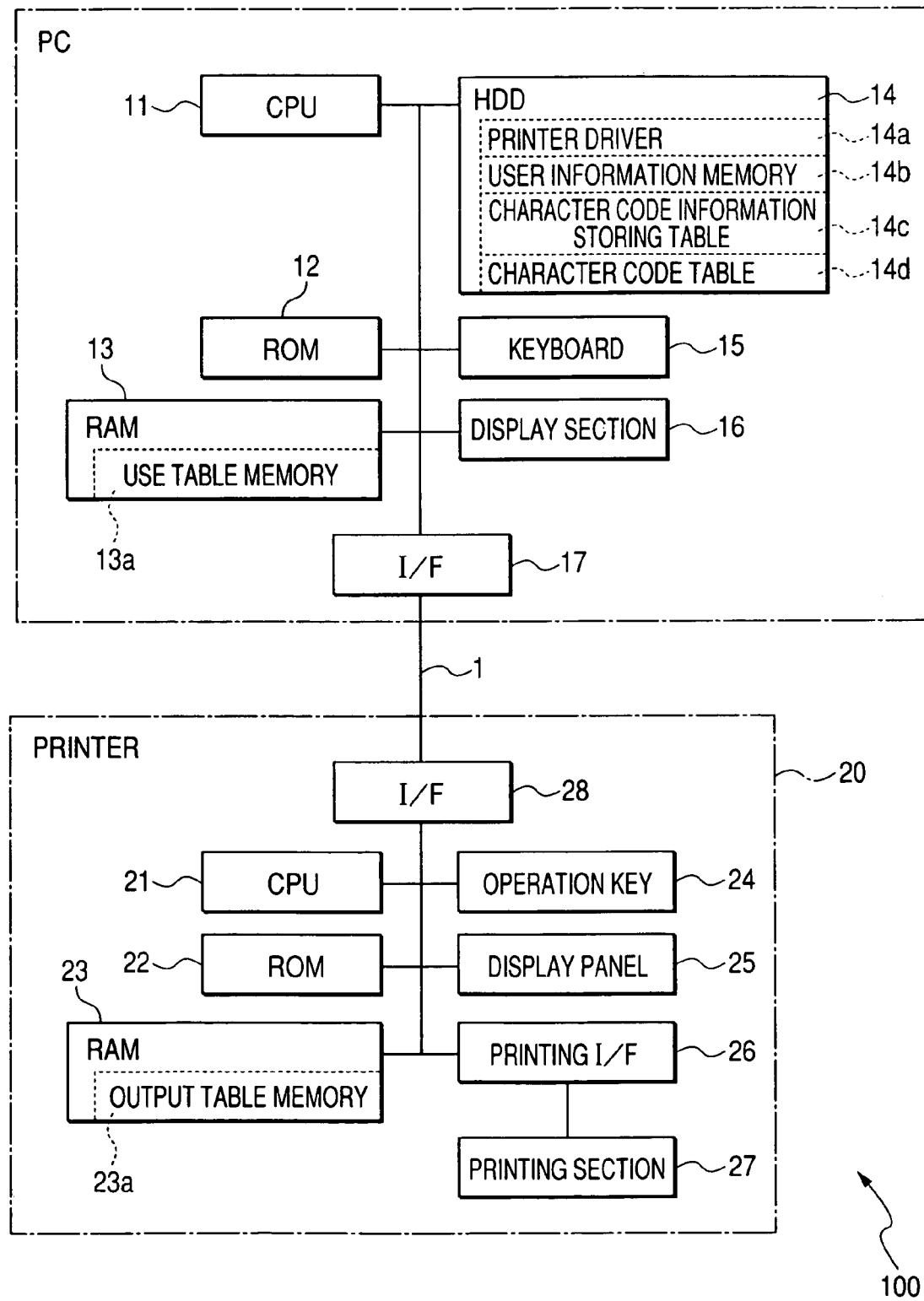
FIG. 1 is a block diagram illustrating a printing system of a first illustrative aspect.

According to a first aspect of the invention, a request is made by a code system information request unit for a printing apparatus to transmit information on a code system of character codes stored in the printing apparatus. The information of the code system transmitted from the printing apparatus in response to the request is received by a code system receiving unit. Information desired by an operator is input by an operation input unit. However, where attribute information is input by the operation input unit, an input operation according to a code system received by the code system receiving unit, among code systems associated with character codes stored in the character code storing unit, is executed by an attribute information input unit. The input attribute information is transmitted to the printing apparatus and displayed on a display of the printing apparatus.

A code system of characters input on the side of a print control apparatus is allowed to match with a code system of characters on the side of a printing apparatus (output side), thereby avoiding an event that characters (symbols) input on the side of the print control apparatus are displayed differently on the side of the printing apparatus. In general, a printing apparatus and a print control apparatus are mutually independent, and they are set individually in their own manner. As a result, there may be a case where a code system of characters input by a print control apparatus does not match with a code system of characters used by a printing apparatus. Where the code systems are not matched, characters input by the print control apparatus are displayed on the printing apparatus as characters different from input characters (occurrence of so-called garbled characters). However, in the present apparatus, even when a code system for inputting characters (symbols) is different from a code system of a printing apparatus (code system used in displaying characters on a display of a printing apparatus), attribute information, which is information transmitted to the printing apparatus, is input by the code system of the printing apparatus. Therefore, there is no occurrence of garbled characters.

Thus, an operator need not match a code system of characters (symbols) input on the side of a print control apparatus with a code system on the side of a printing apparatus, thereby facilitating handling of the print control apparatus and the printing apparatus to reduce a burden to the operator. In addition, where plural code systems are stored in the print control apparatus and the printing apparatus, a code system of input characters may be changed depending on the operator. In the present apparatus, in response to changing inputting attribute information in the situation where the code system of input characters, an operator does not need to change the code system. Thus, the ability of the operator to use the printing apparatus is improved.

According to a second aspect of the invention, attribute information input by an attribute information input unit is displayed on a display section by the attribute information display unit, by which an operator can confirm visually the attribute information input by himself or herself. Accordingly, since the operator can realize characters (symbols) actually input in input operation of attribute information in a case where the attribute information is input by a code system different from an ordinary code system, he or she can realize easily that the attribute information displayed on a display of a printing apparatus is input by himself or herself. In other words, the operator can make a correct judgment whether print data printed by a printing apparatus are attributed to him or her.

According to a third aspect of the invention, since a character/symbol display unit, which outputs on a display section characters or symbols attributed to a code system received by a code system receiving unit and displays the characters or symbols that can be input as attribute information by an attribute information input unit, is provided, an operator can realize correctly the characters or symbols input as attribute information. An operator tends to execute an input operation in a usual manner, even where the attribute information is input by the attribute information input unit in a code system different from an ordinary input. As a result, there occurs a non-conformity in that characters (symbols) that an operator intends to input are not actually input or those that he or she does not intend to input are actually input. This may give an unpleasant feeling to the operator. In the present apparatus, since the character/symbol display unit can display on a display section characters or symbols attributed to a code system (namely, code system of a printing apparatus) received by the code system receiving unit, thereby notifying an operator of the characters or symbols that can be input as attribute information, the operator can understand causes of the above non-conformity and also realize the characters or symbols that can be input, thus execute the input operation smoothly.

According to a fourth aspect of the invention, since a screen input unit is provided which conducts a selecting action on characters or symbols displayed on a display section by a character/symbol display unit to input the selected characters or symbols, it is possible to execute input operation of attribute information by the screen input unit. Therefore, an operator can directly select characters or symbols that can be input as attribute information and input them, thereby inputting correctly the attribute information within a range of characters or symbols that can be input as attribute information. In other words, since the attribute information is input within a range of the characters (symbols) that can be input, characters (symbols) that cannot be input or those that an operator does not intend to input are excluded, thereby providing the operator with a comfortable environment for input operation.

According to a fifth aspect of the invention, upon execution of input operation of attribute information by an operation input unit, characters or symbols associated with the input operation are selected according to a predetermined basic code system, which is a code system for inputting ordinary information, and a judgment is made by a judgment unit for whether or not the selected characters or symbols are attributed to a code system received by the code system receiving unit. Then, where the selected characters or symbols are judged not to be attributed to the received code system, an invalid display unit displays on a display section an indication that input of the input characters or symbols is not allowed. Thereby, an operator is notified through the input operation that characters that the operator intends to input are not allowed to be input.

An operator tends to execute an input operation in a usual manner, in response to changing a code system for inputting attribute information. In other words, there is often a case where upon execution of input operation of the attribute information, characters (symbols) that the operator desires to input are characters to be input by a basic code system associated with the input operation. In the present apparatus, a predetermined basic code system is used to select characters or symbols, and such an indication is given that no input operation can be executed where the selected characters (symbols) are not found in the received code system. The operator, therefore, can realize that characters that he or she desires to input are not allowed to be input.

According to a sixth aspect of the invention, upon execution of input operation of attribute information by an operation input unit, characters or symbols associated with the input operation are selected according to a predetermined basic code system, which is a code system for inputting ordinary information, and a judgment is made by a judgment unit for whether or not the selected characters or symbols are attributed to a code system received by the code system receiving unit. Then, where the selected characters or symbols are judged not to be attributed to the received code system, an input of the characters or symbols is not executed and the attribute information to be input is restricted by a restriction unit. Thereby, it is possible to avoid the input of characters (symbols) that an operator does not intend. An operator tends to execute an input operation in a usual manner, in response to changing a code system in inputting attribute information. In other words, there is often a case where upon execution of input operation of the attribute information, characters (symbols) that the operator desires to input are characters to be input by a basic code system associated with the input operation. Therefore, in response to simply inputting characters (symbols) associated with an input operation according to the received code system by an operation input unit upon execution of input operation of attribute information, characters (symbols) that the operator does not desire (or intend) to input may be input. This is because a different code system may result in different characters to be input, in response to executing the same input operation. Where such characters (symbols) are input that are different from those that he or she intends to input, the operator must cancel the entire input, which is additional labor. Further, when the operator is not aware of the incorrect input, meaningless attribute information that is not recognizable by the operator is displayed on a display of a printing apparatus.

However, in the present apparatus, characters or symbols input are selected according to a predetermined basic code system, and where the selected characters (symbols) are not found in a received code system, the input is regarded as invalid. This makes it possible to avoid an input of characters (symbols) that an operator does not intend, to remove the above-described operation of canceling the input or to prevent an event that attribute information not recognizable by the operator is displayed on the printing apparatus.

An attribute information display unit is provided which displays on a display section attribute information by an attribute information input unit, thereby displaying the attribute information that is input by the attribute information input unit. Accordingly, since the attribute information, the input of which becomes invalid is not displayed on a display section, an operator can easily understand that the input is not accepted, despite the input operation.

According to a seventh aspect of the invention, in response to inputting attribute information, the information is input by an attribute information input unit according to a code system received from a code system receiving unit. In response to executing input operation of the attribute information by an operation input unit, first, characters or symbols associated with the input operation are selected according to a predetermined basic code system, which is a code system for inputting ordinary information, and a judgment is made by a judgment unit for whether or not the selected characters or symbols are attributed to a code system received by the code system receiving unit. Then, where the selected characters or symbols are judged to be attributed to a received code system, the selected characters or symbols are input according to the received code system (character codes associated with the received code system). Thereby, characters (symbols) input according to the basic code system, namely, characters (symbols) that an operator intends to input, are allowed to be input according to a code system of a printing apparatus.

In general, an input operation is associated with each character code of a code system, and in response to executing input operation by an operation input unit, characters or symbols associated with the input operation are selected according to a code system on the input side. Then, the selected characters or symbols are input. Namely, in response to inputting attribute information simply according to a code system received by a code system receiving unit, characters or symbols associated with input operation of an operation input unit are to be selected from a received code system and input. However, an operator tends to execute input operation in a usual manner, in response to changing a code system in inputting the attribute information. In other words, there is often a case where upon execution of input operation of the attribute information, characters (symbols) that the operator desires to input are characters to be input according to a basic code system associated with the input operation. Therefore, in response to simply inputting characters (symbols) in compliance with the input operation of the operation input unit according to the received code system, upon execution of input operation of attribute information, characters (symbols) that are different from those that the operator intends (or desires) to input may be input. This is because a different code system may result in different characters to be input, in response to executing the same input operation.

Therefore, in the present apparatus, where input operation of attribute information is executed by an operation input unit, characters or symbols associated with the input operation are selected according to a basic code system. Where the selected characters or symbols are judged to be attributed to a code system received by the code system receiving unit, the selected characters or symbols are to be input according to the received code system. Thereby, characters (symbols) input according to the basic code system, namely, those that an operator intends to input, are allowed to be input according to a code system of a printing apparatus.

According to an eighth aspect of the invention, where character codes of a code system received by a code system receiving unit are not stored in a character code storing unit, a code request unit requests a printing apparatus to transmit character codes associated with a code system received by the code system receiving unit. The character codes transmitted from the printing apparatus in response to the request from the code request unit are received by the code receiving unit. Then, each of the character codes received by the code receiving unit is matched by a matching unit with characters or symbols that can be input by the operation input unit on the basis of an associated relationship with characters or symbols predetermined with respect to each of the received character codes. Where attribute information is input by an attribute information input unit, the information is input by a receipt code input unit according to a code system matched by the matching unit.

Even where a code system of a printing apparatus is not stored in a character code storing unit, the code system of the printing apparatus is used to input attribute information. In general, a print control apparatus and a printing apparatus are mutually independent, and the printing apparatus to be combined with the print control apparatus is often unknown. Consequently, in response to attempting input operation for execution according to the code system of the printing apparatus, the print control apparatus is required to associate with various code systems. However, in order to store all various code systems, memory capacity is increased, which is not desirable. In the present apparatus, a character code can be obtained from the printing apparatus and input associated with code systems of various types of printing apparatuses that are therefore available (for example, in a case where a code system to be stored in a print control apparatus is single), even when various character code systems associated with various types of printing apparatuses are not stored in a character code storing unit. As a result, the character code storing unit can be reduced in memory capacity, thereby producing the present apparatus at a lower cost.

Hereinafter, an explanation will be made for preferred illustrative aspects of the present invention by referring to the drawings. FIG. 1 is a block diagram illustrating a printing system 100, which is a first illustrative aspect of the present invention. The printing system 100 comprises a personal computer 10 (hereinafter, simply abbreviated as PC), which is the first illustrative aspect of the print control apparatus of the present invention and a printer 20 connected via a cable 1 to the PC 10. The printing system 100 is a printing system for displaying information such as a job name and a username input into the printer 20 from the PC 10 on a display panel 25 of the printer 20 without garbling the information. The information such as the job name and the username is input according to a code system of the printer in the PC 10.

The PC 10 comprises a display section 16 comprising a CPU (Central Processing unit) 11, a ROM (Read Only Memory) 12, a RAM (Random Access Memory) 13, a hard disk drive (HDD) 14, a keyboard 15 and a liquid crystal display (LCD). The PC 10 also comprises an interface (I/F) 17.

The keyboard 15 is an input apparatus provided with plural input keys formed so as to be depressed and a mode key for setting an input mode and constituted so that both "kana" characters and alphabet characters can be input. Characters (symbols) associated with the input keys are indicated on the key top of each input key, and depression of an input key inputs a character (symbol) indicated on the key top concerned. In response to depressing the input key, a character code (symbol) associated with the site depressed and the input mode is formed and input in the CPU 11. Even depression of the same input key will result in formation of a different character code, when the input mode is different. For example, when an input mode is to input "kana" characters, a character code for specifying a "kana" character in compliance with an input key is formed. When an input mode is to input English letters, a character code for specifying English letters (alphabets) in compliance with input keys is formed. In a similar manner, even operation of the same input key will result in formation of a character code for inputting half-size characters, when an input mode is a half-size input mode, and formation of a character code for inputting full-size characters, when an input mode is a full-size input mode.

In inputting ordinary information, characters associated with the formed character code are selected according to a character code table 14*d* (refer to HDD 14) of a code system (basic code system) set by an operating system (OS) of the PC 10, and the selected characters are displayed on a display section 16 (execution of input operation). It is noted that the PC 10 is constituted so that a code system set by the OS can be designed or changed arbitrarily on the basis of code systems stored in the HDD 14, in response to conducting a predetermined operation by an operator.

The CPU 11 is a computing unit for executing programs stored in the ROM 12 or the RAM 13. The ROM 12 is a read-only memory for storing basic programs such as boot programs.

The RAM 13 is a rewritable memory and provided with a use table memory 13*a*. The use table memory 13*a* is a memory for storing one character code table 14*d* to be used in inputting user information. Where the user information is input, in principle, the character code table 14*d* indicated by code system information obtained from a printer 20 is selected from the character code table 14*d* stored in the HDD 14 and stored in the use table memory 13*a*.

Since the user information is information transmitted to a printer 20 and displayed in the printer 20, it is desirable to input the information according to the same code system as the printer 20 (code system that is in use at the printer 20). This is because, where a code system of the printer 20 is different from that used in an input operation at a PC 10, characters input at the PC 10 are output in different characters at the printer 20, in which so-called garbled characters occur. In the present illustrative aspect, code system information obtained from the printer 20 is used to select a character code table 14*d* and the selected character code table 14*d* (code system) is then used to input the user information, thereby making it possible to avoid an event in which the user information is garbled.

More specifically, when a character code is formed by depressing input keys of the keyboard 15 on input operation of user information, characters (symbols) associated with the character code are selected according to a character code table 14*d* of a code system (basic code system) set by the OS of the PC 10, and thereafter the character code of the selected characters is again obtained from the use table memory 13*a* to form the user information, which is transmitted to the printer 20. At the same time, characters associated with the obtained character code are displayed on a display section 16 (execution of input operation of characters according to a code system of the printer 20).

Where a code system indicated by code system information obtained from the printer 20 is the same as a code system of an OS of a PC 10 or the code system of the printer 20 is unknown, a character code table 14*d* of a code system set by the OS is written into a use table memory 13*a* and the character code table 14*d* of the code system set by the OS is used to execute the input operation of user information.

It is acceptable that the use table memory 13*a* is constituted so as to store plural character code tables 14*d* and a flag associated with each of the stored character code tables 14*d* is provided at the RAM 13 so as to indicate one character code table (namely, input code system) used by turning the flag on. It is also acceptable that the use table memory 13*a* is constituted not to store the character code table 14*d* in itself but to store information on a code system indicating one character code table 14*d* to be used (namely, input code system).

Figure 7:
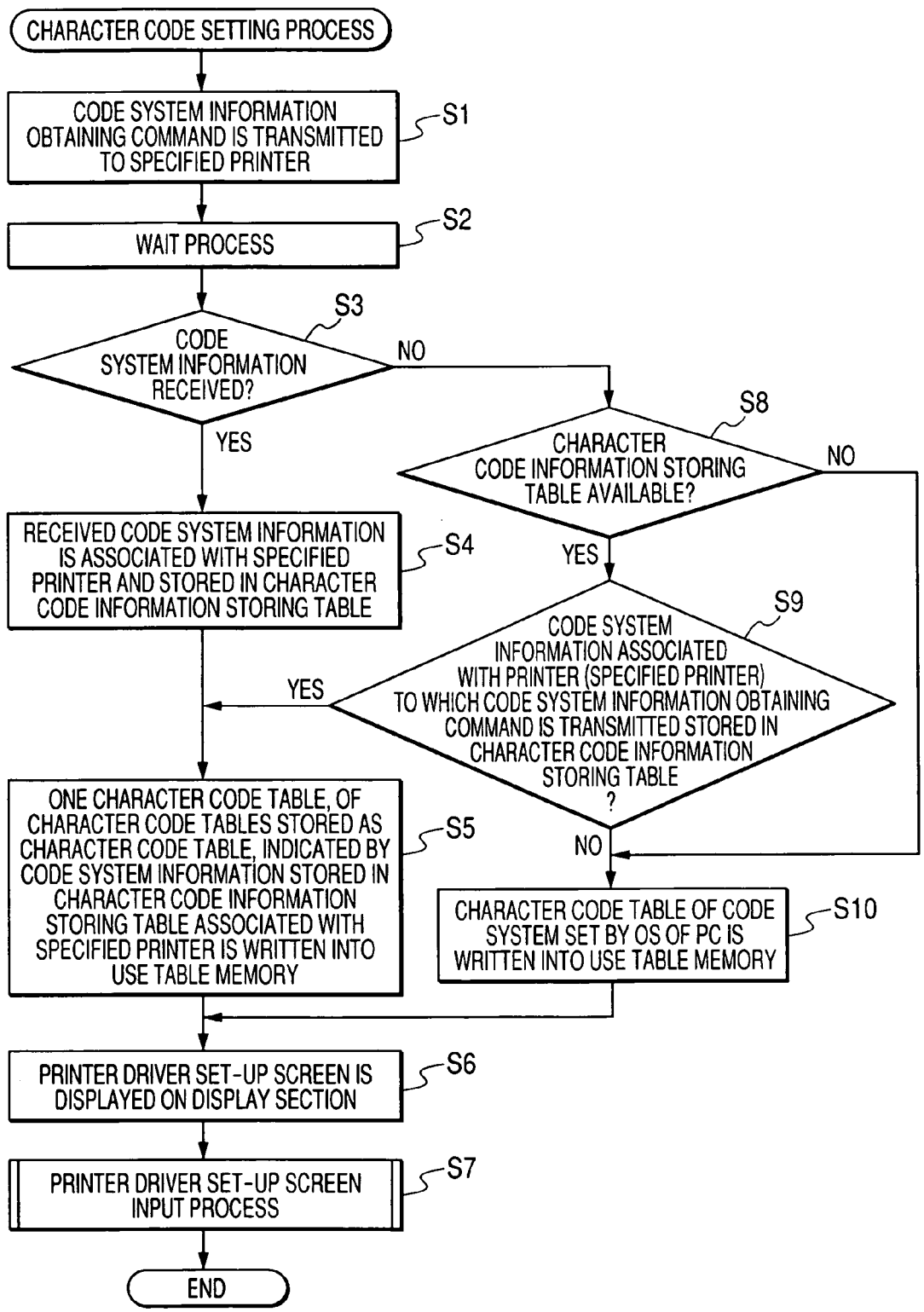
FIG. 7 is a flow chart illustrating a character code setting process executed by the PC.
Figure 8:
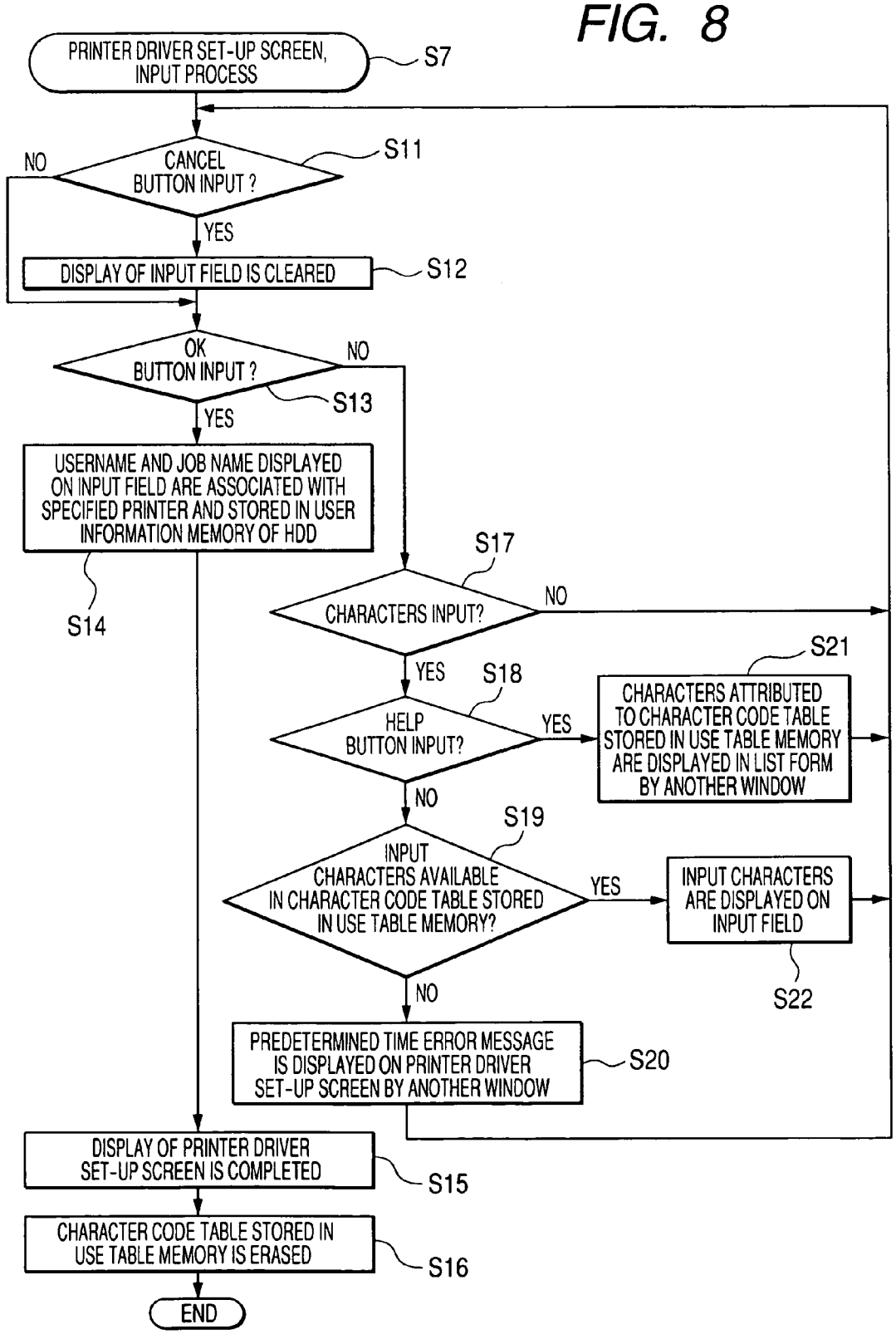
FIG. 8 is a flowchart illustrating a printer driver set-up screen input process executed in the character code setting process shown in FIG. 7.

The HDD 14 is a rewritable memory for storing operating systems and various application programs executed by the PC 10. FIG. 7 and FIG. 8 show flow charts of programs used in a printer driver 14*a*, which are also stored in the HDD 14. The printer driver 14*a* is a driver program of a printer 20 connected to the PC 10 and intervenes between an application program of the PC 10 and the printer 20 to assist in exchanging data between them. The printer driver 14*a* is provided at each printer and given functions to set a printer 20 associated therewith (to be controlled). An operator can input a desired username and a desired job name to be displayed on the output side of the printer 20 on output of print data by activating the printer driver 14*a*.

The user information memory 14*b* is a memory for storing user information set arbitrarily by an operator. The user information memory 14*b* stores a username and a job name input from a printer driver 14*a* as user information for each printer. The username and the job name are information for specifying a user of a printer 20. Where print data are transmitted from the PC 10 to the printer 20, the username and the job name stored in the user information memory 14*b* are added to the print data and sent out to the printer 20, together with the print data (refer to FIG. 4). In the printer 20, the received username and the job name are displayed on a display panel 25 to notify a user of the attribute of the print data during printing. Thereby, the user can confirm which print data are being output (so-called job management).

The character code information storing table 14*c* is a memory for storing code system information obtained from the printer concerned by each printer associated with a port name. An explanation will be made for the character code information storing table 14*c* by referring to FIG. 2. FIG. 2 is a view schematically illustrating the character code information storing table 14*c*. The character code information storing table 14*c* is a table, which stores by each printer a port name indicating a port to be connected with a printer 20 and code system information indicating a code system set for the printer 20. In the present illustrative aspect, one printer 20 (printer name of "Printer 1") is connected to one parallel port (port name of "LPT 1") and another printer 20 (printer name of "Printer 2") (not illustrated) is connected to a USB port (port name of "USB"), and user information of two units of printers 20 is stored in the character code information storing table 14*c* by each printer.

The printer driver 14*a* is designed so that a code system information obtaining command, which requests information on a code system of a printer 20 (code system information) is transmitted to the associated printer 20 in setting the printer 20 to be used in the PC 10. Code system information transmitted from the printer 20 in response to the code system information obtaining command is stored in the character code information storing table 14*c* associated with the printer name. In the present illustrative aspect, the code system information of "JISX0201" obtained from one printer 20 is stored associated with the printer 20 (printer name of "Printer 1"), and the code system information of "HPROMAN8" obtained from another printer 20 is stored associated with the printer 20 concerned (printer name of "Printer 2").

An explanation will be made by reverting to FIG. 1. A character code table 14d is a table for indicating characters (symbols) associated with a character code. The table indicates characters (symbols) associated with input keys depressed and referred in response to inputting characters (symbols). Contents of the character code table 14d differ for each code system. In the present illustrative aspect, plural character code tables 14d are stored in a HDD 14 so that the input operation can be executed according to plural code systems in a PC 10. An explanation will be made for the character code table 14d by referring to FIGS. 3A and 3B. FIGS. 3A and 3B are views schematically illustrating the character code table 14d.

As described above, a character code is generated in response to depressing individual keys on a keyboard 15. The character code table 14d stores characters (symbols) associated with the character code so that characters (symbols) can be specified by the character code. FIG. 3A is a view illustrating the character code table 14d for the code system of "JISX0201." The "JISX0201" is a one-byte code system of "katakana" characters, which makes it possible to input both alphabet characters and "kana" characters. The character code table 14d covers 50-character kana syllabary from 'a' to "n," in addition to upper case letters from "A" to "Z" and lower case letters from "a" to "z." Each of the characters is associated with its own unique character code (unique value in the range of A0h to FFh).

FIG. 3B is a view illustrating a character code table 14d of the code system of "HPROMAN8." The "HPROMAN8" is a one-byte code system for inputting alphabet characters, and the character code table 14d covers upper case letters from "A" to "Z" and lower case letters from "a" to "z." Each of the alphabets is associated with its own unique character code (unique value in the range of A0h to FFh). However, as illustrated in FIG. 3B, the character code table 14d of "HPROMAN8" is not provided with "kana" characters from "a" to "n." Therefore, where characters are input by using the code system of "HPROMAN8," "kana" characters cannot be displayed.

FIGS. 3A and 3B show an image of characters (symbols) associated with a character code. In reality, the character code table 14d stores an address of memory (not illustrated) in which image data of associated characters are stored in association with the character code.

FIGS. 3A and 3B show the character code table 14d stored in the HDD 14, as an example. However, the HDD14 stores plural character code tables 14d associated with code systems such as "Unicode" and "JISX0208," in addition to the above-described code systems of "JISX0201" and "HPROMAN8."

As described above, an associated relationship between characters and a character code indicating the characters is not uniform but differs in each code system. However, where a code system of a PC 10 (input side) is different from that of a printer 20 (output side) in transmitting data output by the printer 20 from the PC 10 not in a form of dot data but according to a character code, garbled characters occur due to a difference in characters associated with the character code. However, in the present illustrative aspect, user information (username and job name) transmitted to the printer 20 is input according to the code system of the printer 20, thereby making it possible to avoid the occurrence of garbled characters.

An explanation will be made by reverting to FIG. 1. The display section 16 is a display section for displaying characters, graphic forms and icons. The I/F 17 is an interface for exchanging data and others with a printer 20 connected via a cable 1.

The printer 20 comprises a CPU 21, a ROM 22, a RAM 23, an operation key 24, display panel 25, a typing I/F 26, a printing section 27 and an I/F 28. The CPU 21 is a computing unit to execute programs stored in the ROM 22. The ROM 22 is an unrewritable memory, which stores control programs executed by the CPU 21 and fixed values. The printer 20 comprises a rewritable non-volatile flash memory (not illustrated) in which plural character code tables are stored. The character code table is similar to a character code table 14d provided on a PC 10 and used in selecting print data received from the PC 10 and characters output from character codes such as a username and a job name. Since the flash memory is non-volatile memory, data stored in the memory can be kept in response to turning off the printer 20.

The RAM 23 is a rewritable memory and provided with an output table memory 23a. The output table memory 23a is a memory storing a character code table used in outputting print data to a printing section 27 and also outputting a username and a job name to a display panel 25. Plural above-described character code tables are stored in a flash memory of a printer 20 as well. One table is used in outputting data, and the character code table used (a code system used) is written into the output table memory 23a and stored in response to turning on the power. Which character code table is to be stored in the output table memory 23a is determined in advance by the factory setting. Specific information for specifying the character code table concerned is stored in the above flash memory. A character code table stored in the output table memory 23a is allowed to be changed by a predetermined operation of an operation key 24. In response to conducting the changing operation, a character code table after change is written into the output table memory 23a to change the content of the output table memory 23a. Further, specific information of the flash memory is changed to specific information for specifying the character code table after change.

The CPU 21 transmits to a PC 10 code system information indicating a code system (code system during use, code system of a printer 20) of a character code table stored in the output table memory 23a on receipt of a code system information obtaining command from the PC 10. Therefore, a code system that is actually used is transmitted to the PC 10.

Figure 6:
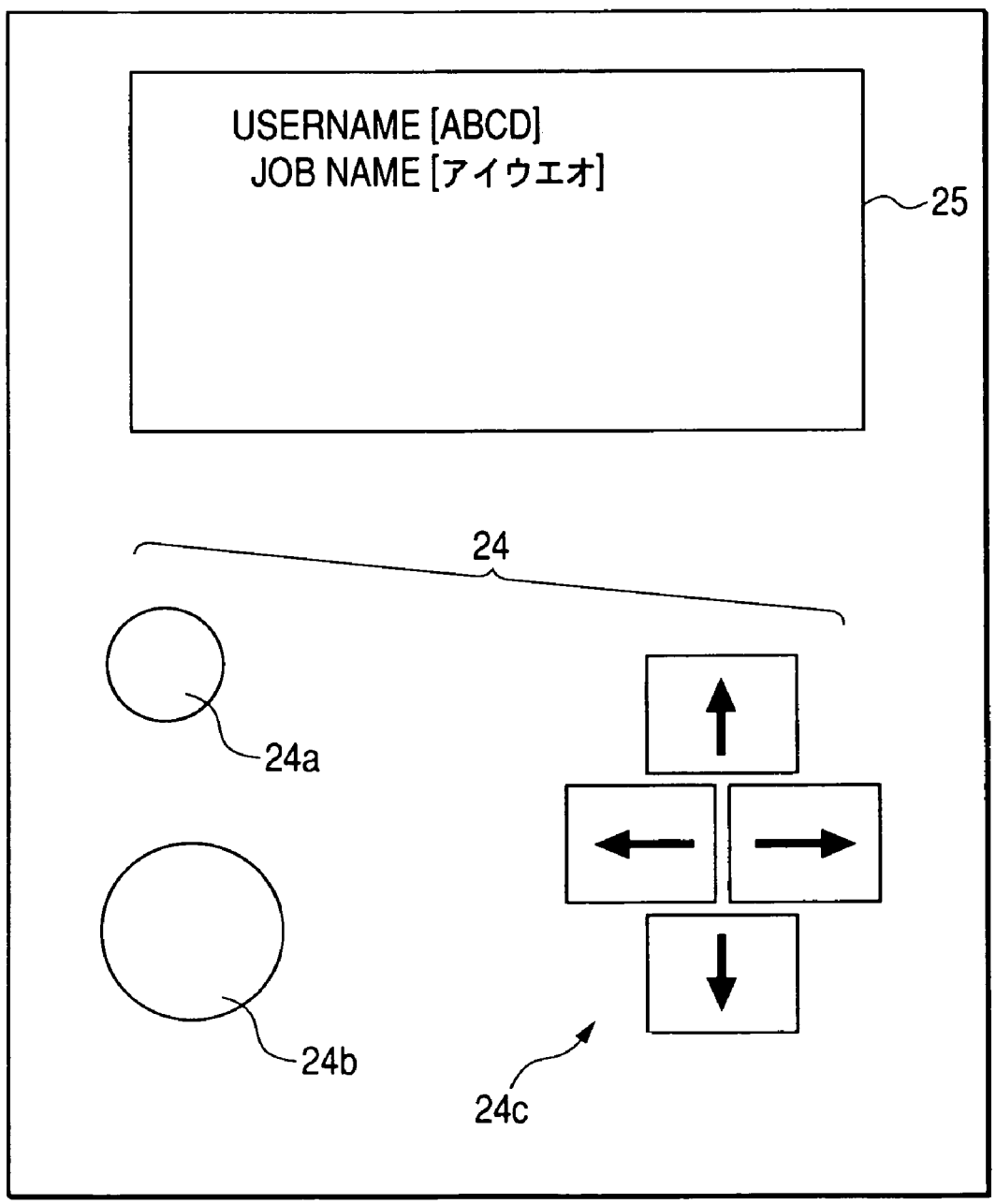
FIG. 6 is a view illustrating an operation area provided on the outer surface of a cabinet of the printer.

The operation key 24 is an input apparatus for operating the printer 20. Herein, a specific explanation will be made for the operation key 24 with referring to FIG. 6. FIG. 6 is a view illustrating an operation area partially provided on the outer surface of the cabinet of the printer 20. The operation area is constituted with the operation key 24 and a display panel 25, and the operation key 24 comprises a cancel key 24a for discontinuing printing in progress, a setting key 24b for indicating change in setting and deciding input information and a selection key 24c for selecting various types of information displayed on the display panel on depression of the setting key 24b. An operator can provide the printer 20 with various settings by using the operation key 24. For example, in a case of change in a code system (code system during use) of the printer, the display panel 25 is allowed to display items that can be set by depression of the setting key 24b, the selection key 24c is used to change the code system and select a code system after change, and the setting key 24b is again depressed. Such procedures make it possible for the operator to recognize the selected code system inside the printer 20 (change in a code system).

The display panel 25 is a display section for displaying characters, graphic forms, icons and the like. Where print data are being printed, a username and a job name transmitted together with the print data from the PC 10 are displayed on the display panel 25. The printing section 27 illustrated in FIG. 1 is to print forms and transmit the printed forms. The I/F 28 is an interface for exchanging data and the like with the PC 10 connected to a cable 1.

Figure 4:
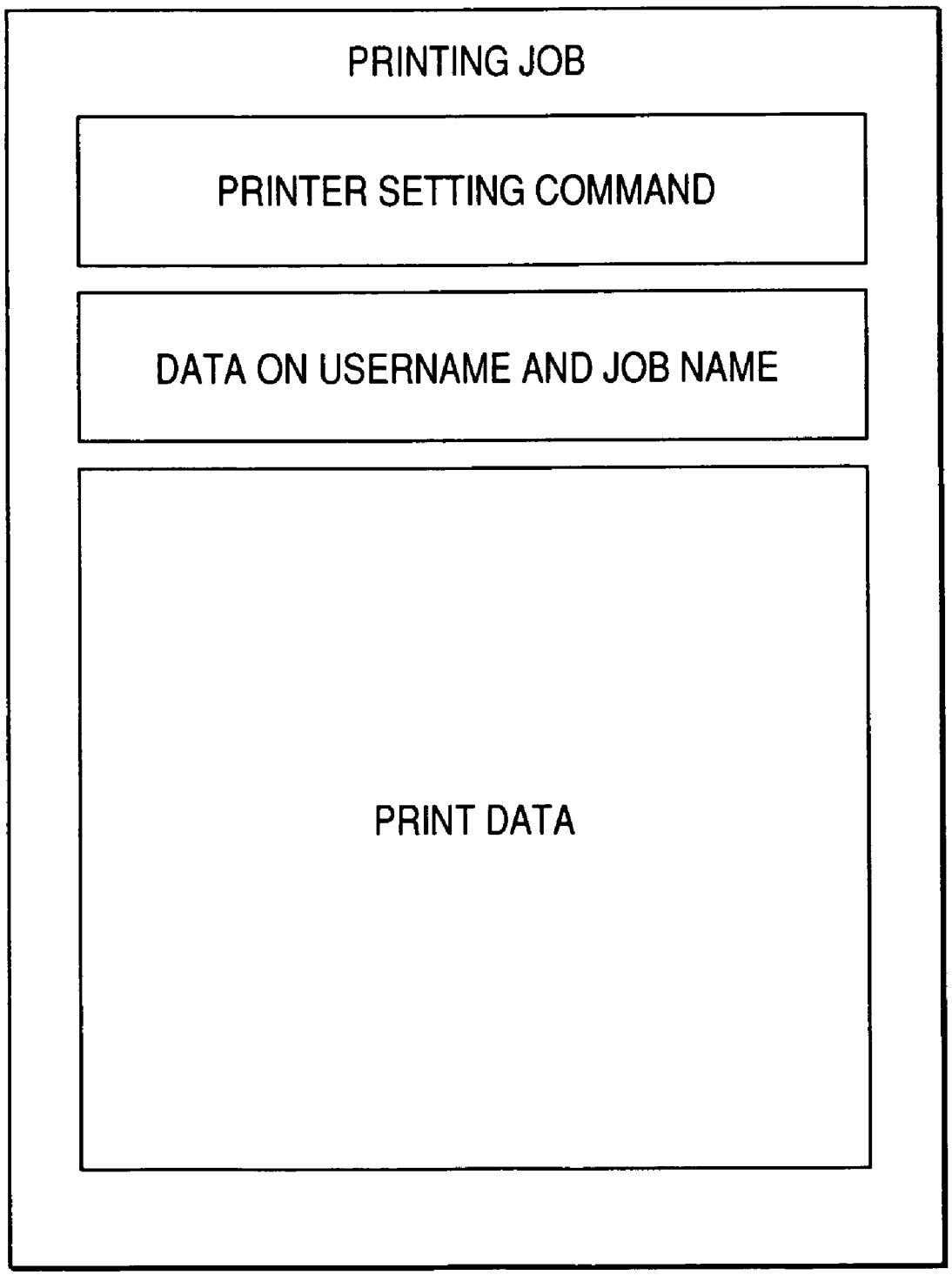
FIG. 4 is a view schematically illustrating a printing job transmitted from a PC to a printer.

In thus constituted printing system 100, the PC 10 activates a printer driver 14a to transmit a group of data (printing job) to the printer 20 in executing printing. FIG. 4 is a view schematically illustrating the printing job transmitted from the PC 10 to the printer 20. As illustrated in FIG. 4, the printing job is constituted with a username and a job name to be added to the leading end of the print data as is well as a printer setting command to be added to the leading end of the username and the job name in order to indicate print data to be printed and a transmission source of the print data. The printer setting command is a command for setting the printer 20 to indicate the resolution, sleep time, record forms and the like.

The print data, username and job name are data prepared by input operation from the keyboard 15 in which input characters (symbols) are indicated by character codes formed in response to a code system input at the PC 10.

The PC 10 forms a username and a job name to be transmitted to the printer 20 not in a form of dot data but according to a character code. Since the character code is more effective in reducing an amount of information than the dot data, (reduction in data to be transmitted), it is advantageous in terms of communication speed. Herein, the PC 10 and the printer 20 are mutually independent, and they are individually set in their own manner. Therefore, there is often a case where they are different in a code system. Where data transmitted from the PC 10 to printer 20 are formed according to the character code, the data will result in garbled characters. However, the username and the job name are input according to the code system of the printer 20 (code system during use by the printer) by the PC 10. Therefore, characters selected by the printer 20 from a character code of the username and the job name are in agreement with the characters input by an operator of the PC 10 in the PC 10. Thus, there is no occurrence of garbled characters resulting from a difference in a code system between the PC 10 and the printer 20.

Figures 5A, 5B:
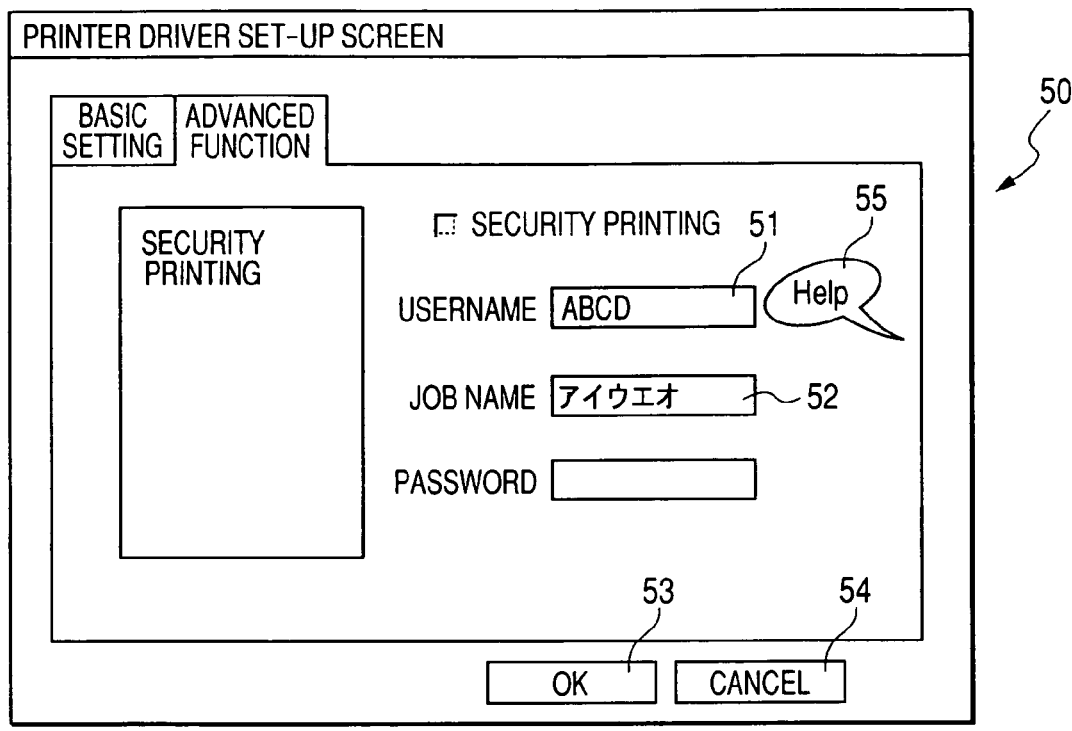
FIGS. 5A and 5B are views illustrating a screen displayed on a display section in response to activating a printer driver of the PC by an operator.

FIGS. 5A and 5B are views illustrating a screen displayed on a display section 16 of the PC 10, in response to activating a printer driver 14a by an operator. FIG. 5A illustrates a printer driver set-up screen 50, and FIG. 5B illustrates a character code list 56, which is displayed together with the printer driver set-up screen 50.

As illustrated in FIG. 5A, the printer driver set-up screen 50 comprises input fields 51 and 52, which are allowed to be input from a keyboard 15. The input field 51 is an input field for inputting a username and the input field 52 is an input field for inputting a job name. An operator can input the username and the job name on the printer driver set-up screen 50.

Where plural printers 20 are connected to a PC 10, printer drivers 14a are individually set to each of the printers 20, and one printer 20 associated with one printer driver 14a. Upon activation of the one printer driver 14a, the associated one printer 20 is allowed to be set on the printer driver set-up screen 50 during display. In other words, activation of the printer driver 14a will specify the one printer 20. FIG. 5A illustrates the printer driver set-up screen 50 displayed in response to activating the printer driver 14a of the printer 20 whose printer name is "Printer 1" by an operator.

The username and the job name input on the printer driver set-up screen 50 are cleared upon input of a "cancel" button 54 provided on the printer driver set-up screen 50. Further, in response to inputting an "OK" button 53, the input is judged to be completed by a CPU 11, and display on the printer driver set-up screen 50 is ceased. In addition, the username and the job name input in input fields 51 and 52 are written into a user information memory 14b with a printer associated with an activated printer driver 14a. Therefore, on completion of input operation on the printer driver set-up screen 50 illustrated in FIG. 5A, the username and the job name are written into the user information memory 14b associated with the printer 20 whose printer name is "Printer 1." FIG. 5A gives an input example of the username and the job name. The username of "ABCD" is displayed on the input field 51 and the job name of "AIUEO" is displayed on the input field 52. Herein, the displayed username of "ABCD" and the job name of "AIUEO" are input according to the code system of "JISX0201" of the printer 20 whose printer name is "Printer 1," and the associated character code of "JISX0201" is imparted to each of the characters.

The printer driver set-up screen 50 comprises a "Help" button 55 for displaying characters (symbols) that can be input as a username and a job name. In response to inputting the "Help" button 55, the character code list 56 give in FIG. 5B is displayed on another window. The character code list 56 displays characters attributed to a character code table 14d stored in a use table memory 13a, namely, characters attributed to a code system of a printer 20.

In the present illustrative aspect where the printer driver set-up screen 50 displays the printer name of "Printer 1" associated with the printer 20, a character code list 56 of the associated code system of "JISX201" is illustrated in FIG. 5B.

Where a code system of the printer 20 is different from a code system set according to the OS of the PC 10, a username and a job name are input not according to a code system of the OS but according to the code system of the printer 20 (character code table stored in a use table memory 13a). Namely, characters that can be input are those attributed to the code system of the printer 20.

Herein, for example, where a code system set by the OS is "JISX201," ordinary information is input according to a code system of the OS in the PC 10, thereby making it possible to input both "kana" characters and English letters. In contrast, where a code system of the printer 20 is "HPROMAN8," a username or a job name cannot be input by "kana" characters. Therefore, where an input mode is according to input operation of "kana" character, characters specified by operating input keys (characters selected by the code system of "JISX201") are not available in the code system of "HPROMAN8." Therefore, in response to attempting to execute the input operation repeatedly, no characters are input, thereby resulting in an event that nothing is displayed on an input field 51 or 52. Therefore, the present illustrative aspect is constituted so that on depression of a "Help" button 55, characters attributed to a character code table 14d stored in a use table memory 13a are displayed to notify an operator of characters that can be input as a username or a job name.

A displayed character code list 56 is divided by each character, and each division 57 is to act as an input button for the character displayed on the division concerned. Therefore, an operator can input desired characters on the screen of the character code list 56. In addition, since characters to be displayed on each division 57 are all those that can be input as a username or a job name, an operator who is not familiar with operating a keyboard 15 to input the username or the job name can input such information without fail.

Where printing job is transmitted to an associated printer 20, the username of "ABCD" and the job name of "AIUEO" input on the printer driver set-up screen 50 illustrated in FIGS. 5A and 5B are sent out as a part of the printing job. Herein, since each of the characters covering the username of "ABCD" and the job name of "AIUEO" is sent out according to a character code of "JISXO201," the characters are to be displayed on a display panel 25 of the printer 20, which are the same characters that are input on the printer driver set-up screen 50, as illustrated in FIG. 6.

An explanation will be made for individual processes for setting user information in a PC 10 by referring to flow charts of FIG. 7 and FIG. 8. The control shown in the flow charts of FIG. 7 and FIG. 8 is the control of a printer driver 14a executed in the PC 10.

FIG. 7 is a flow chart illustrating a character code setting process, which is started in response to activating a printer driver 14a by a predetermined operation. Since the printer driver 14a is provided so as to associate with each of the printers 20, the character code setting process is a process for setting the one printer 20 associated with the printer driver 14a. Further, since user information is input according to a code system of the associated printer 20 (specified printer) in the character code setting process, code system information is obtained from the specified printer 20.

In the character code setting process, first, a code system information obtaining command is transmitted to a specified printer, namely, one printer 20 associated with a printer driver 14a (S1). Thereafter, there is a predetermined waiting time process established on the basis of a response time associated with the code system information obtaining command (S2). After the wait process of S2, confirmation is made for whether or not code system information is received (S3). In response to receiving (S3: Yes), the received code system information is associated with the specified printer (one printer associated with a printer driver 14a under activation, the printer 20 to which the code system information obtaining command is transmitted) and stored in a character code information storing table 14c (S4).

One character code table 14d is written into a use table memory 13a, which is indicated by a code system information stored in a character code information storing table 14c associated with a specified printer, among individual character code tables 14d stored as a character code table 14d (S5). Further, in the process of S5, where no character code table 14d associated with the specified printer 20 is found in a HDD 14, a character code table 14d of a code system set by an OS is written into the use table memory 13a.

A printer driver set-up screen 50 is displayed on a display section 16 (S6), and a printer driver set-up screen input process is executed, in which the input operation is executed on the printer driver set-up screen 50 (S7). Then, upon completion of the printer driver set-up screen input process (S7), the character code setting process is also completed.

After confirmation at the process of S3, in response to receiving no code system information (S3: No), confirmation is made for whether or not a character code information storing table 14c is available in a HDD 14 (S8). When the character code information storing table 14c is available (S8: Yes), confirmation is made for whether or not code system information associated with a printer to which a code system information obtaining command is transmitted (specified printer) is stored in the character code information storing table 14c (S9). When the associated code system information is stored (S9: Yes), the process concerned is transferred to the process of S5 in order to execute the input operation by referring to code system information obtained so far.

After confirmation at the process of S8, when a character code information storing table 14c is not available in a HDD 14 (S8: No) and after confirmation at the process of S9, when code system information associated with a printer to which a code system information obtaining command is transmitted (specified printer) is not stored in the character code information storing table 14c (S9: No), a character code table 14d associated with a code system set by an OS of a PC 10 is written into the use table memory 13a (S10), and the process is transferred to the process of S6. Therefore, where the code system information associated with the printer to which the code system information obtaining command is transmitted (specified printer) is not stored in the character code information storing table 14c, namely, where a code system of a printer 20 is unknown, the input operation is to be executed according to the code system set by the OS of the PC 10.

FIG. 8 is a flow chart illustrating a printer driver set-up screen input process executed in the character code setting process of FIG. 7. The printer driver set-up screen input process (S7) is a process for inputting information such as user information associated with the input operation by an operator on a printer driver set-up screen 50 (refer to FIGS. 5A and 5B) displayed on a display section 16. In the printer driver set-up screen input process, confirmation is first made for whether or not a "cancel" button 54 on the printer driver set-up screen 50 is input (S11). In response to not inputting the "cancel" button 54 (S11: No), the process of S12 is skipped and the process is transferred to the process of S13. Further, in response to inputting the "cancel" button 54 (S11: Yes), data, which are input to the input fields 51 and 52 of the printer driver set-up screen 50 are cleared (S12), and confirmation is then made for whether or not an "OK" button 53 on the printer driver set-up screen 50 is input (S13). Herein, in response to inputting the "OK" button 53 (S13: Yes), a username and a job name displayed on the input fields 51 and 52 are associated with a specified printer and stored in a user information memory 14b of a HDD 14 (S14). Further, an input field for inputting a password is provided in the printer driver set-up screen 50. Where the password has been input into the input fields, the input password is stored in the user information memory 14b, together with the username and the job name.

After completion of the display on the printer driver set-up screen 50 (S15), a character code table stored in the use table memory 13a is erased (S16) to complete the printer driver set-up screen input process (S7). As described above, one printer driver 14a is set for every HDD 14 associated with each of printers 20, and the printer 20 to be set is changed for every printer driver 14a. Therefore, at the time in response to completing the printer driver set-up screen input process (S7), a character code table 14d stored in a use table memory 13a is erased, thereby avoiding the input of user information based on an incorrect character code table 14d.

After confirmation at the process of S13, in response to not inputting an "OK" button 53 (S13: No), the input by an operator is judged to continue, and confirmation is made for whether or not characters are input (S17). In the process of S17, depression of a "Help" button 55 is judged to be the input of characters, in addition to the depression of an input key on a keyboard 15 and the input operation of any division 57 of a character code list 56 (input button of character). Where it is judged after the confirmation that characters are input (S17: Yes), a judgment is made for whether or not the "Help" button 55 is input (S18). In response to not inputting the "Help" button 55 (S18: No), the operation is either the depression of an input key on the keyboard 15 or the input operation of any division 57 of the character code list 56 (input button of character). When it is the depression of an input key on the keyboard 15, a character associated with the depression of the input key is selected according to a code system set by an OS to give the input character. When it is the input operation of any division 57 of the character code list 56 (input button of character), a character displayed on the division concerned is regarded as an input character and confirmation is made for whether or not the input character is available in a character code table 14d stored in a use table memory 13a (S19).

As a result, where the input character is not available in the character code table 14d stored in the use table memory 13a (S19: No), the input of the character is invalid (no availability of the associated character code). Therefore, a predetermined time error message (for example, "the character is not allowed to be input" and the like) is displayed on a printer driver set-up screen 50 by using another window (S20), and thereafter, the process is transferred to the process of S11. As described so far, a character associated with the depression of an input key is selected according to a code system set by an OS. Where the character is not attributed to the character code table 14d stored in the use table memory 13a, the process of S22 is not performed, which displays the input character. Namely, in response to executing the input operation, no character is input in response to the operation. Namely, by branching to "No" in S19, the input is not to be executed, thereby making it possible to avoid the input of characters that an operator does not intend.

After confirmation at the process of S17, in response to not inputting a character (S17: No), the process is transferred to the process of S11, and input of an "OK" button 53 or input of a character is waited. In addition, after confirmation at the process of S18, in response to inputting a "Help" button 55 (S18: Yes), a character attributed to a character code table 14d stored in a use table memory 13a is displayed on a display section 16 in a list form (character code list 56) by using another window (S21). Then, a subsequent process is transferred to the process of S11. Further, after confirmation at the process of S19, when the above input character is available in the character code table 14d stored in the use table memory 13a (S19: Yes), the input character is displayed at a specified input site (input fields 51 and 52 or input field of password) (S22). The input site is specified by selecting an input field prior to the input of characters. After the input character is displayed (input), the process is transferred to the process of S11.

The printer driver set-up screen 50 comprises a setting screen for conducting a basic setting, in addition to an input screen for inputting a username and a job name. In a printer driver set-up screen input process (S7), a step (not illustrated) is used to confirm whether or not input of the basic setting is requested. Then, the printer driver set-up screen input process (S7) is constituted so that the setting screen for conducting the basic setting is displayed, when so requested, and input of the basic setting is executed according to the input operation on the setting screen performed by an operator. Further, while the setting screen for conducting the basic setting is on display, an "OK" button 53 is displayed. In response to inputting the "OK" button 53, the printer driver set-up screen input process (S7) is completed. In addition, in response to completing the display on the printer driver set-up screen 50, the display of the character code list 56 is also completed.

As described so far, according to the printing system 100 of the present illustrative aspect, information transmitted from a PC 10 to a printer 20 such as user information (username and job name) can be input according to the code system of the printer 20 in the PC 10. As a result, the information input in the PC 10 can be displayed on an operation panel 25, without the occurrence of garbled characters.

Next, a second illustrative aspect will be explained with reference to FIG. 9. The above-described first illustrative aspect is constituted in such a way that the character code setting process is conducted to obtain code system information indicating the code system concerned from a printer 20, and where a character code table 14d associated with the code system information is not stored in a HDD 14, the character code table 14d of a code system set according to an OS of a PC 10 is written into a use table memory 13a, and the user information is input according to the code system of the OS. In contrast, the second illustrative aspect is constituted in such a way that where a character code table 14d associated with the obtained code system information is not stored in the HDD 14, a character code table used in a printer 20 is obtained and the character code table obtained from the printer 20 is used to input user information. It is noted that the same symbols are given to the parts, which are the same as those of the first illustrative aspect, the explanation of which is omitted, and an explanation will be made for different parts only.

Figure 9:
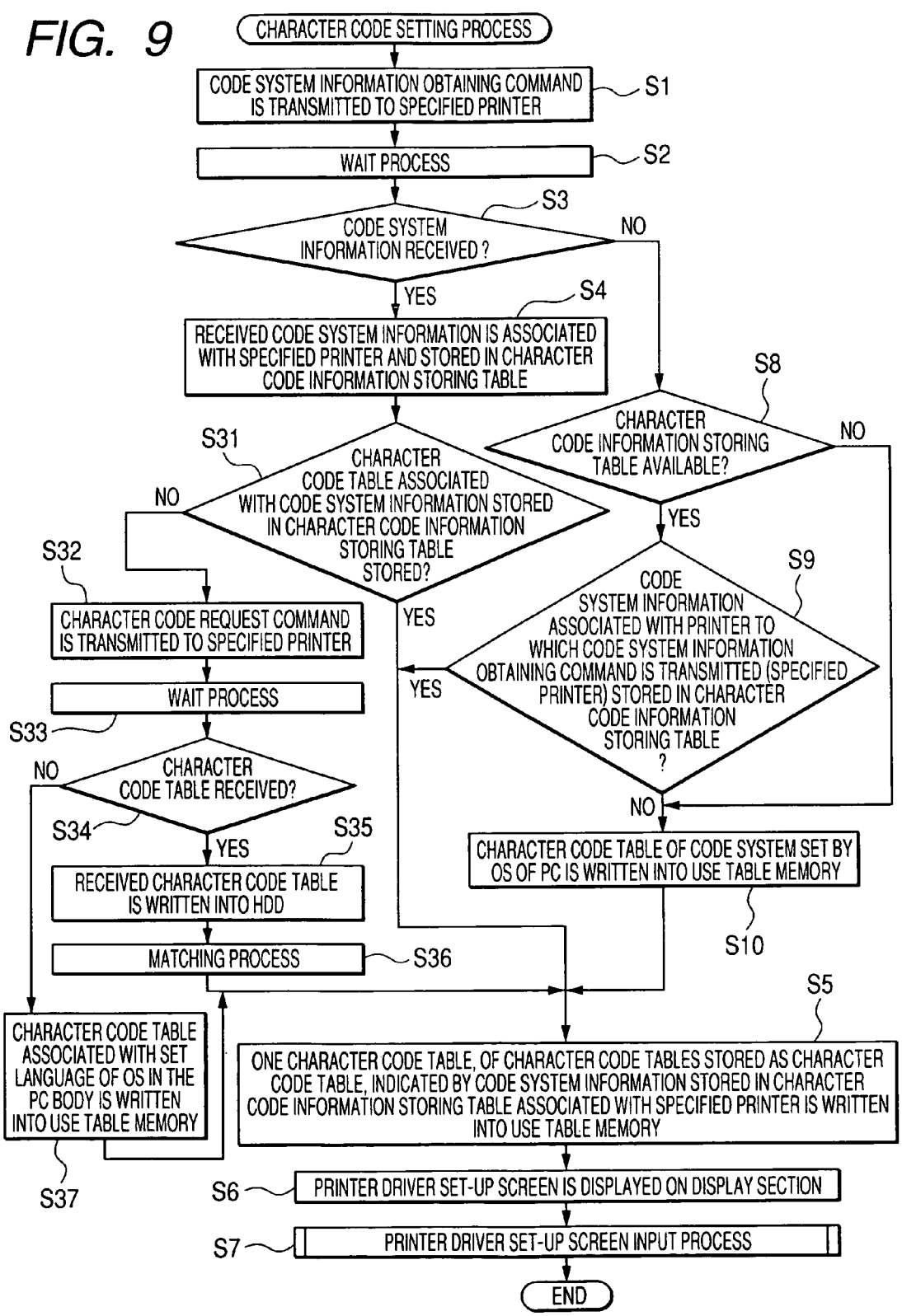
FIG. 9 is a flow chart illustrating a character code setting process executed by the PC in a second illustrative aspect.

FIG. 9 is a flow chart illustrating a character code setting process executed at the PC 10 of the second illustrative aspect. The character code setting process of the second illustrative aspect is started in response to conducting a predetermined operation to activate a printer driver 14a, as with the first illustrative aspect, and code system information is obtained from a printer (specified printer) 20 associated with a printer driver 14a (S1 to S4). Where the code system information is not obtained from the printer 20, a code system set by the OS of the PC 10 is used to input the user information (S8 to S10).

Here, in the second illustrative aspect, in response to obtaining the code system information, confirmation is made for whether or not a character code table 14d associated with the obtained code system information (code system information written into the character code information storing table 14c) is stored in the HDD 14 (S31), when it is stored (S31: Yes), as with the first illustrative aspect, the associated character code table 14d is written into the use table memory 13a, and the obtained code system is used to input the user information (S5 to S7).

After confirmation at the process of S31, when the associated character code table 14d is not stored in a HDD 14 (S31: No), a character code request command is transmitted to a specified printer 20, which requests to transmit a character code table in itself of the code system during use (S32). After a wait process is conducted for a predetermined time (S33), confirmation is made for whether or not the character code table is received (S34), in response to receiving (S34: Yes), the received character code table is written into the HDD 14 (as anew character code table 14d) (S35), and thereafter, a matching process is conducted (S36).

The matching process (S36) is a process in which a conversion table stored in advance in a PC 10 is used to allocate characters (font) to a character code of the received character code table of a printer 20. After the matching process, the process is transferred to the process of S5. According to a route in which the process is transferred to the process of S5 after the process of S36, a character code table written into a use table memory 13a is to be obtained from the printer 20. Therefore, the input operation is executed according to the character code written into the use table memory 13a in a printer driver set-up screen input process (S7), by which user information is to be input according to the code system of the printer 20. It is, therefore, possible to input the user information according to the code system of the printer 20 without fail. Further, after confirmation at the process of S34, in response to receiving no character code table from the printer 20 (S34: No), a character code table 14d associated with a code system set by an OS of a PC 10 is then written into the use table memory 13a (S37) and the process is transferred to the process of S5.

As explained so far, in the second illustrative aspect, where the character code table 14d associated with the code system of the printer 20 is not stored in the PC 10, the character code table in itself is obtained from the printer 20. Therefore, the user information can be reliably input according to the code system of the printer, thereby making it possible to inhibit garbled characters effectively.

The character code setting process illustrated in FIG. 7 and FIG. 9 and the printer driver set-up screen input process illustrated in FIG. 8 fall under the control programs of the print control apparatus described in the Claims. Recognizing the input of characters displayed on a division 57 by a selecting action on the division 57 of a character code list 56 displayed at the PC 10 falls under the screen input unit. The process of S5 in which the character code table received from the printer 20 is written into a use table memory 13a in the character code setting process of the second illustrative aspect as illustrated in FIG. 9, and the processes of S19 and S22 in which a character code table 13a written into the use table memory 13a is used to input characters fall under the receipt code input unit and the receipt code input step. The process in which the PC 10 transmits a printing job to the printer 20 falls under the transmission step.

An explanation has been so far made for the present invention on the basis of the illustrative aspects. However, the present invention is not restricted to the above-described illustrative aspects in any way, and it is easily understood that the present invention may be improved or modified in a versatile manner, without deviating from its gist.

For example, in each of the above illustrative aspects, one printer 20 is connected to one port of the PC 10. Instead, the PC 10 and the printer 20 used in each of the illustrative aspects may be connected as a network to constitute a printing system in each of the illustrative aspects. Where the PC 10 and the printer 20 are connected as a network, an address on the network of the printer 20 is stored in a character code information storing table 14c, in place of a port name, and the address on the network of the printer 20 is added to the leading end of the printing job transmitted from the PC 10 to the printer 20. It is noted that the address on the network is, for example, IP address, MAC address or bluetooth address.

In each of the above illustrative aspects, a printer is used as a printing apparatus. However, a printing apparatus used in the present invention is not restricted to a printer, and various types of output apparatuses connected to the PC 10 and capable of outputting data from the PC 10 such as a facsimile machine, a copier, their combination and the combination with a printer may be used for this purpose.

Still further, in each of the illustrative aspects, in response to inputting user information, the PC 10 selects characters associated with a character code generated, from a code system set by the OS and selects a character code associated with the selected characters from a code system of a printer 20, thereby inputting the user information according to the code system of the printer 20. Instead, the PC 10 may be constituted so as to select characters associated with the character code generated by input operation of the user information directly from the code system of the printer 20. Since the input characters are displayed on a display apparatus 16, an operator can notice that characters output are different from those that the operator intends to input due to a change in a code system, upon input of the user information, and also to estimate that the code system has been changed by referring to the display. For example, the operator notices that a "kana" input operation is not allowed but an English letter input operation is allowed. Since it is relatively easy for an operator to perform a character input operation appropriate for a code system, the input operation is not made extremely difficult in response to using the code system of the printer 20 to directly convert the input operation to characters. Further, algorithm used in the input operation can be simplified to conduct the process at a higher speed.

In each of the above illustrative aspects, in response to inputting user information, on the side of the PC 10, the user information is input according to the code system of the printer 20, in response to not changing a code system by an operator. Instead, e.g. when plural code system are associated with the printer 20, a code system, which the operator desires, may be selected from the plural code system.

Figure 10:
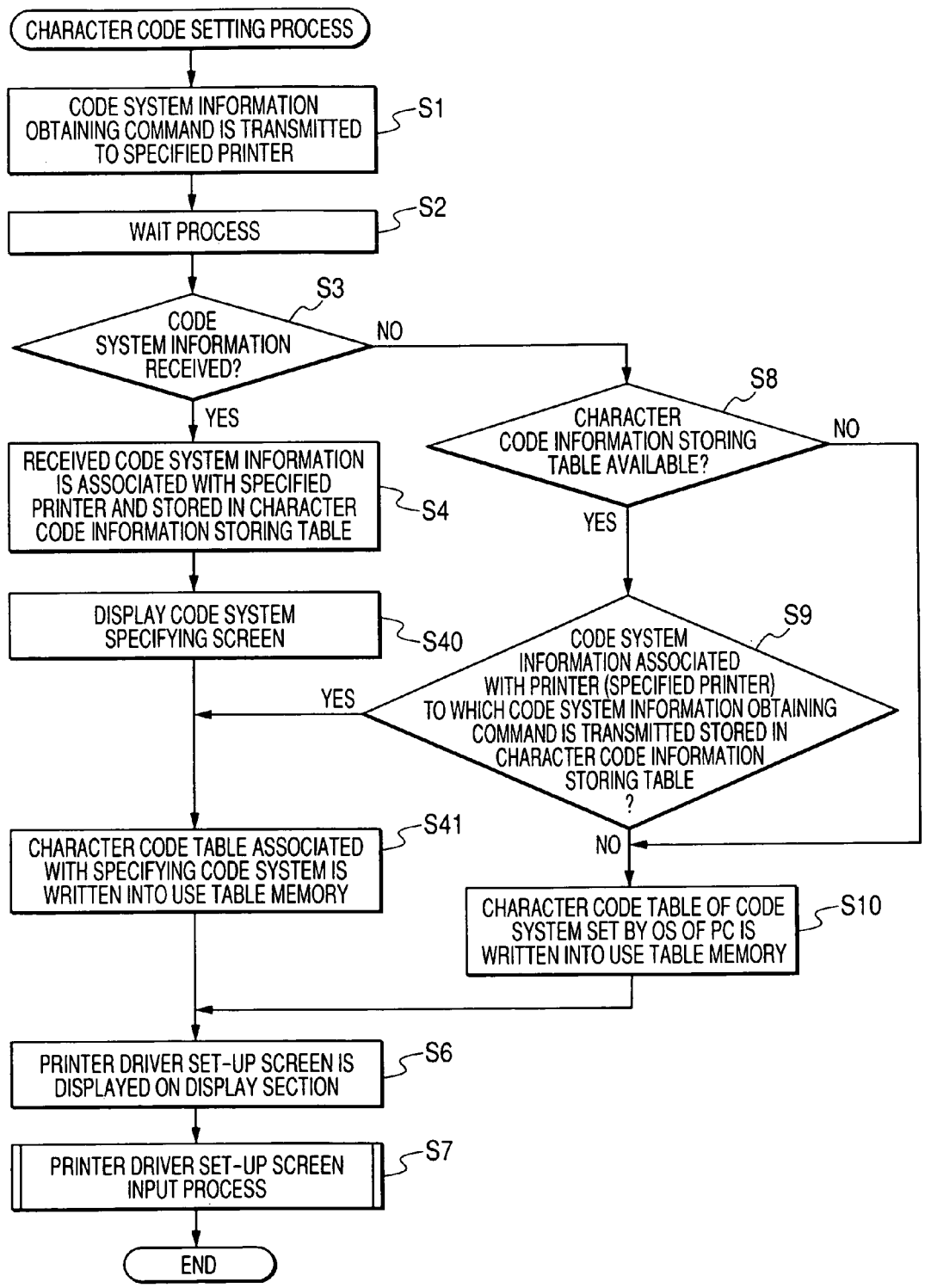
FIG. 10 is a flow chart illustrating another example of the character code setting process executed by the PC.

The processing in this case is described with reference to the FIG. 10. Processing with FIG. 7 has the same reference numeral and explanation is omitted. Feature of FIG. 10 resides in the processing S40, which displays a screen to specify a code system used by the operator on a basis of the code system information received from the printer 20 in the steps S3 and S4. Specifically, code system information comprised in the character code table 14d provided in the PC 10 is selected from code system information received from the printer 20, and displayed on the display. In the screen on the display, a name representing the code system and an example of character belonging to the code system are displayed, and a message to urge the operator to specify which code system is used. In response to specifying a code system the operator desires via the keyboard 15 according to the message, the command proceeds to S41. A character code table associated with the code system specified by the operator, among the character code tables each stored as the character code table 14d, is written into the use table memory.

What is claimed is:

1. A print control apparatus that transmits print data and attribute information to a printing apparatus and controls the printing apparatus, which is connected to the print control apparatus, the printing apparatus comprising a printing section that prints the print data and a display that displays the attribute information regarding the print data and storing a predetermined character code associated with a character or a symbol displayed on the display, the print control apparatus comprising:

a code system information request unit that requests the printing apparatus to transmit information of a code system of the character code stored in the printing apparatus;

a code system receiving unit that receives information of the code system transmitted from the printing apparatus in response to request of the code system information request unit;

an operation input unit that is operated by a user to input specified information; a character code storing unit that stores a predetermined character code associated with a character or a symbol in each code system; and an attribute information input unit that inputs attribute information according to a code system received by the code system receiving unit among code systems associated with the character code stored in the character code storing unit in response to inputting the attribute information by the operation input unit;

a display section that displays a character or a symbol; and an attribute information display unit that displays the attribute information input by the attribute information input unit on the display section, wherein the attribute information input unit comprises:

a judgment unit that selects a character or a symbol associated with an input operation in a predetermined basic code system, which inputs ordinary information in response to inputting the attribute information by the operation input unit, and judges whether or not the selected character or symbol is attributed to the code system received by the code system receiving unit; and an invalid display unit that indicates on the display section that the input character or symbol is not allowed to be input in response to judging the input character or symbol by the judgment unit not to be attributed to the received code system.

2. The print control apparatus as set forth in claim 1, further comprising: a character/symbol display unit that outputs a character or symbol attributed to a code system received by the code system receiving unit on the display section and displays a character or a symbol input by the attribute information input unit as the attribute information.

3. The print control apparatus as set forth in claim 2, wherein the operation input unit comprises a screen input unit that inputs a character or a symbol selected through a selecting action from the character or symbol displayed on the display section by the character/symbol display unit, and an input operation of attribute information is executed by the screen input unit.

4. The print control apparatus as set forth in claim 1, wherein the attribute information input unit comprises:

a judgment unit that selects a character or a symbol associated with an input operation in a predetermined basic code system, which inputs ordinary information in response to inputting the attribute information by the operation input unit, and judges whether or not the selected character or symbol is attributed to the code system received by the code system receiving unit; and a restriction unit that restricts the input attribute information so as to make input of the character or symbol is nonexecutable in response to judging the input character or symbol by the judgment unit not to be attributed to the received code system.

5. The print control apparatus as set forth in claim 1, wherein the attribute information input unit inputs the selected character or symbol in the received code system, in response to judging a character or a symbol selected by the basic code system by the judgment unit to be attributed to the code system received by the code system receiving unit.

6. The print control apparatus as set forth in claim 1, further comprising:

a code request unit that requests the printing apparatus to transmit a character code associated with a code system received by the code system receiving unit when the character code of the code system received by the code system receiving unit is not stored in the character code storing unit;

a code receiving unit that receives a character code transmitted from the printing apparatus in response to the request of the code request unit; and a matching unit that matches each of the character code received from the code receiving unit with a character or a symbol input by the operation input unit on a basis of a relationship of a predetermined character or a symbol with respect to each of the received character code, wherein the attribute information input unit comprises a receipt code input unit that inputs in a code system in which a character code is matched by the matching unit, in response to inputting the attribute information by the operation input unit.

7. A print control apparatus that transmits print data and attribute information to a printing apparatus and controls the printing apparatus, which is connected to the print control apparatus, the printing apparatus comprising a printing section that prints the print data and a display that displays the attribute information regarding the print data, and storing a predetermined character code associated with a character or a symbol displayed on the display, the print control apparatus comprising:

a code system information request unit that requests the printing apparatus to transmit information of a code system of the character code stored in the printing apparatus;

a code system receiving unit that receives information of the code system transmitted from the printing apparatus in response to request of the code system information request unit;

an operation input unit that is operated by a user to input specified information;

a display section that displays information input by the operation input unit;

a character code storing unit that stores a predetermined character code associated with a character or a symbol in each code system;

a code system using display unit that indicates on the display section, as a usable code system, a code system received by the code system receiving unit, which is included in a code system associated with the character code stored in the character code storing unit;

a code system specifying unit that specifies a desired code system, via the operation input unit, from the code system displayed by the code system using display unit; and an attribute information input unit that inputs by using the code system specified by the code system specifying unit, in response to inputting the attribute information by the operation input unit, wherein the attribute information input unit comprises:

a judgment unit that selects a character or a symbol associated with an input operation in a predetermined basic code system, which inputs ordinary information in response to inputting the attribute information by the operation input unit, and judges whether or not the selected character or symbol is attributed to the code system received by the code system receiving unit; and an invalid display unit that indicates on the display section that the input character or symbol is not allowed to be input in response to judging the input character or symbol by the judgment unit not to be attributed to the received code system.

8. A computer program product for enabling a computer to control a print control apparatus that is connected to a printing apparatus comprising a printing section that prints print data and a display that displays attribute information regarding the print data and storing a predetermined character code associated with a character or a symbol displayed on the display, and comprises an operation input unit that inputs information through operation by a user, comprising:

software instructions for enabling the computer to perform predetermined operations; and a computer readable medium bearing the software instructions, the predetermined operations comprising the steps of:

transmitting the print data and the attribute information to the printing apparatus;

requesting the printing apparatus to transmit the information on a code system of a character code stored in the printing apparatus;

receiving the information of the code system transmitted from the printing apparatus in response to the request; and inputting the attribute information by using the received code system, in response to inputting the transmitted attribute information by the operation input unit, wherein the step of inputting the attribute information comprises the steps of:

selecting a character or a symbol associated with an input operation in a predetermined basic code system, which inputs ordinary information in response to inputting the attribute information by the operation input unit, and judging whether or not the selected character or symbol is attributed to the received code system; and restricting the input attribute information so as to make input of the character or symbol is nonexecutable in response to judging the input character or symbol not to be attributed to the received code system.

9. The computer program product as set forth in claim 8, the predetermined operations further comprising the steps of:

outputting a character or a symbol attributed to the received code system on the display section; and inputting the character or symbol selected through a selecting action from a character or symbol displayed on the display section, wherein the step of inputting inputs the attribute information.

10. The computer program product as set forth in claim 8, wherein the step of inputting the attribute information comprises the steps of:

selecting a character or a symbol associated with an input operation in a predetermined basic code system, which inputs ordinary information in response to inputting the attribute information by the operation input unit, and judging whether or not the selected character or symbol is attributed to the received code system; and indicating on the display section that the input character or symbol is not allowed to be input in response to judging the input character or symbol not to be attributed to the received code system.

11. The computer program product as set forth in claim 10, wherein the step of inputting the attribute information inputs the selected character or symbol in the received code system, in response to judging a character or a symbol selected by the basic code system to be attributed to the received code system.

12. The computer program product as set forth in claim 8, the predetermined operations further comprising the steps of:

requesting the printing apparatus to transmit a character code associated with a received code system when the received character code of the code system is not stored in the printing control apparatus;

receiving a character code transmitted from the printing apparatus in response to the request; and matching each of the received character code with a character or a symbol input by the print control apparatus on a basis of a relationship of a predetermined character or a symbol with respect to each of the received character code, wherein the step of inputting the attribute information comprises the step of inputting in a code system in which a character code is matched, in response to inputting the attribute information by the operation input unit.

13. A printing system, comprising:

a printing apparatus that comprises a printing section that prints print data and a display that displays attribute information regarding the print data, and stores a predetermined character code associated with a character or a symbol displayed on the display; and a print control apparatus that is connected to the print control apparatus, transmits the print data and the attribute information to the printing apparatus and controls the printing apparatus, wherein the print control apparatus comprises:

a code system information request unit that requests the printing apparatus to transmit information of a code system of the character code stored in the printing apparatus;

a code system receiving unit that receives information of the code system transmitted from the printing apparatus in response to request of the code system information request unit;

an operation input unit that is operated by a user to input specified information; a character code storing unit that stores a predetermined character code associated with a character or a symbol in each code system; and an attribute information input unit that inputs attribute information according to a code system received by the code system receiving unit among code systems associated with the character code stored in the character code storing unit in response to inputting the attribute information by the operation input unit a display section that displays a character or a symbol; and a character/symbol display unit that outputs a character or symbol attributed to a code system received by the code system receiving unit on the display section and displays a character or a symbol input by the attribute information input unit as the attribute information, wherein the operation input unit comprises a screen input unit that inputs a character or a symbol selected through a selecting action from the character or symbol displayed on the display section by the character/symbol display unit, and an input operation of attribute information is executed by the screen input unit, and wherein the attribute information input unit of the print control apparatus comprises: a judgment unit that selects a character or a symbol associated with an input operation in a predetermined basic code system, which inputs ordinary information in response to inputting the attribute information by the operation input unit, and judges whether or not the selected character or symbol is attributed to the code system received by the code system receiving unit; and an invalid display unit that indicates on the display section that the input character or symbol is not allowed to be input in response to judging the input character or symbol by the judgment unit not to be attributed to the received code system.

14. The printing system as set forth in claim 13, wherein the attribute information input unit of the print control apparatus comprises:

a judgment unit that selects a character or a symbol associated with an input operation in a predetermined basic code system, which inputs ordinary information in response to inputting the attribute information by the operation input unit, and judges whether or not the selected character or symbol is attributed to the code system received by the code system receiving unit; and a restriction unit that restricts the input attribute information so as to make input of the character or symbol is nonexecutable in response to judging the input character or symbol by the judgment unit not to be attributed to the received code system.

15. The printing system as set forth in claim 13, wherein the attribute information input unit of the print control apparatus inputs the selected character or symbol in the received code system, in response to judging a character or a symbol selected by the basic code system by the judgment unit to be attributed to the code system received by the code system receiving unit.

16. The printing system as set forth in claim 13, wherein the print control apparatus further comprises:

a code request unit that requests the printing apparatus to transmit a character code associated with a code system received by the code system receiving unit when the character code of the code system received by the code system receiving unit is not stored in the character code storing unit;

a code receiving unit that receives a character code transmitted from the printing apparatus in response to the request of the code request unit; and a matching unit that matches each of the character code received from the code receiving unit with a character or a symbol input by the operation input unit on a basis of a relationship of a predetermined character or a symbol with respect to each of the received character code, wherein the attribute information input unit comprises a receipt code input unit that inputs in a code system in which a character code is matched by the matching unit, in response to inputting the attribute information by the operation input unit.

* * * * *